United States Patent
Sorenson et al.

[15] 3,669,175
[45] June 13, 1972

[54] BEAD EXPANDER

[72] Inventors: Billy L. Sorenson; Ray A. Scott, both of Fort Dodge, Iowa

[73] Assignee: The Coats Company, Inc.

[22] Filed: Sept. 29, 1969

[21] Appl. No.: 861,564

Related U.S. Application Data

[63] Continuation-in-part of Ser. No. 753,555, Aug. 19, 1968, abandoned.

[52] U.S. Cl. ............................................................ 157/1.1
[51] Int. Cl. ..................................................... A60c 25/00
[58] Field of Search ............................. 157/1.1, 1.17, 1.26

[56] References Cited

UNITED STATES PATENTS

| 3,528,474 | 9/1970 | May | 157/1.1 |
| 2,936,827 | 5/1960 | Riggs | 157/1.1 |
| 2,910,117 | 10/1959 | Lamerson | 157/1.1 |
| 3,016,934 | 1/1962 | Smyser | 157/1.1 X |

*Primary Examiner*—Granville Y. Custer, Jr.
*Attorney*—Hofgren, Wegner, Allen, Stellman & McCord

[57] ABSTRACT

An apparatus for expanding tire beads into seating relationship with a vehicle rim characterized by a rim sealing surface on the member and a generally cylindrical tire side wall sealing surface around the rim supporting surface and fixed to the base.

6 Claims, 8 Drawing Figures

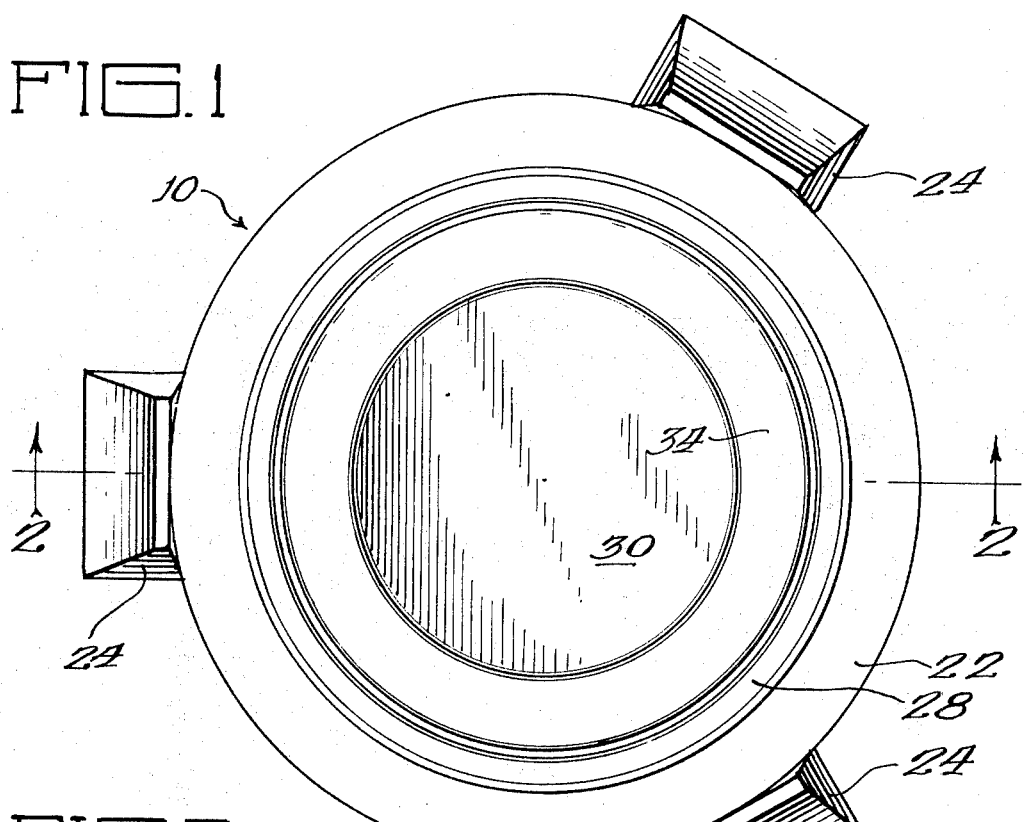
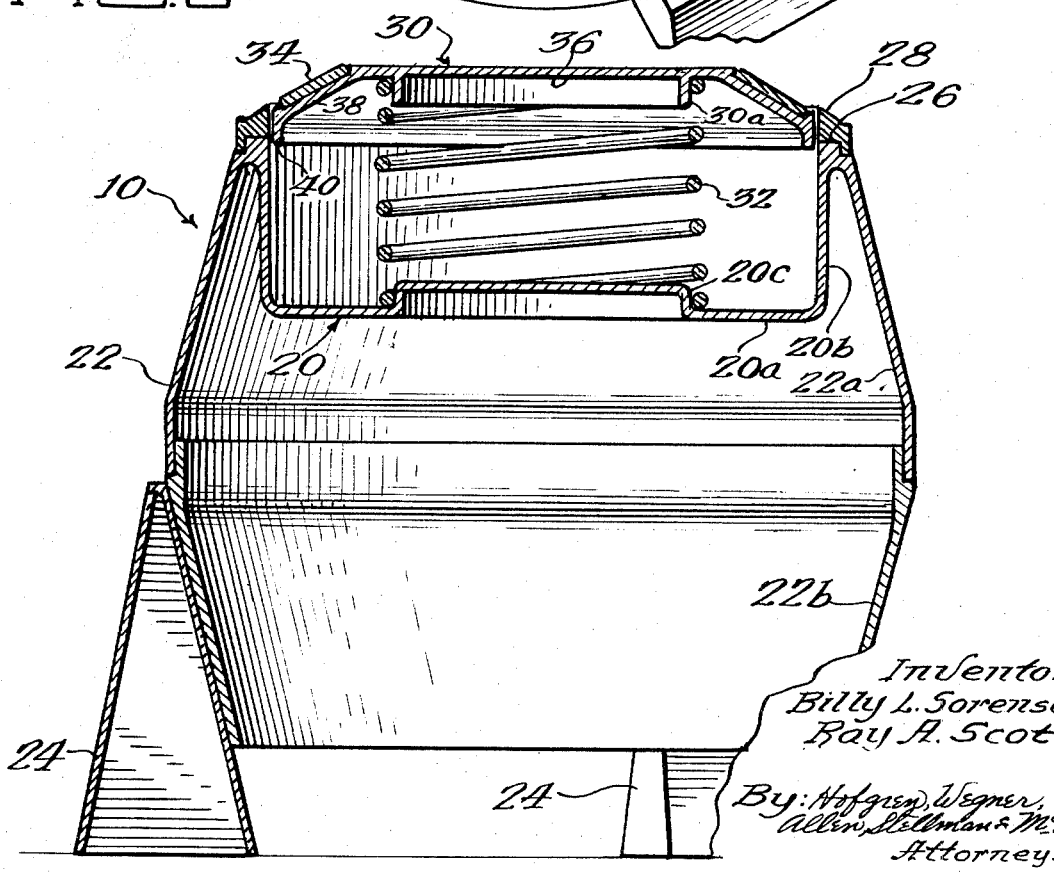

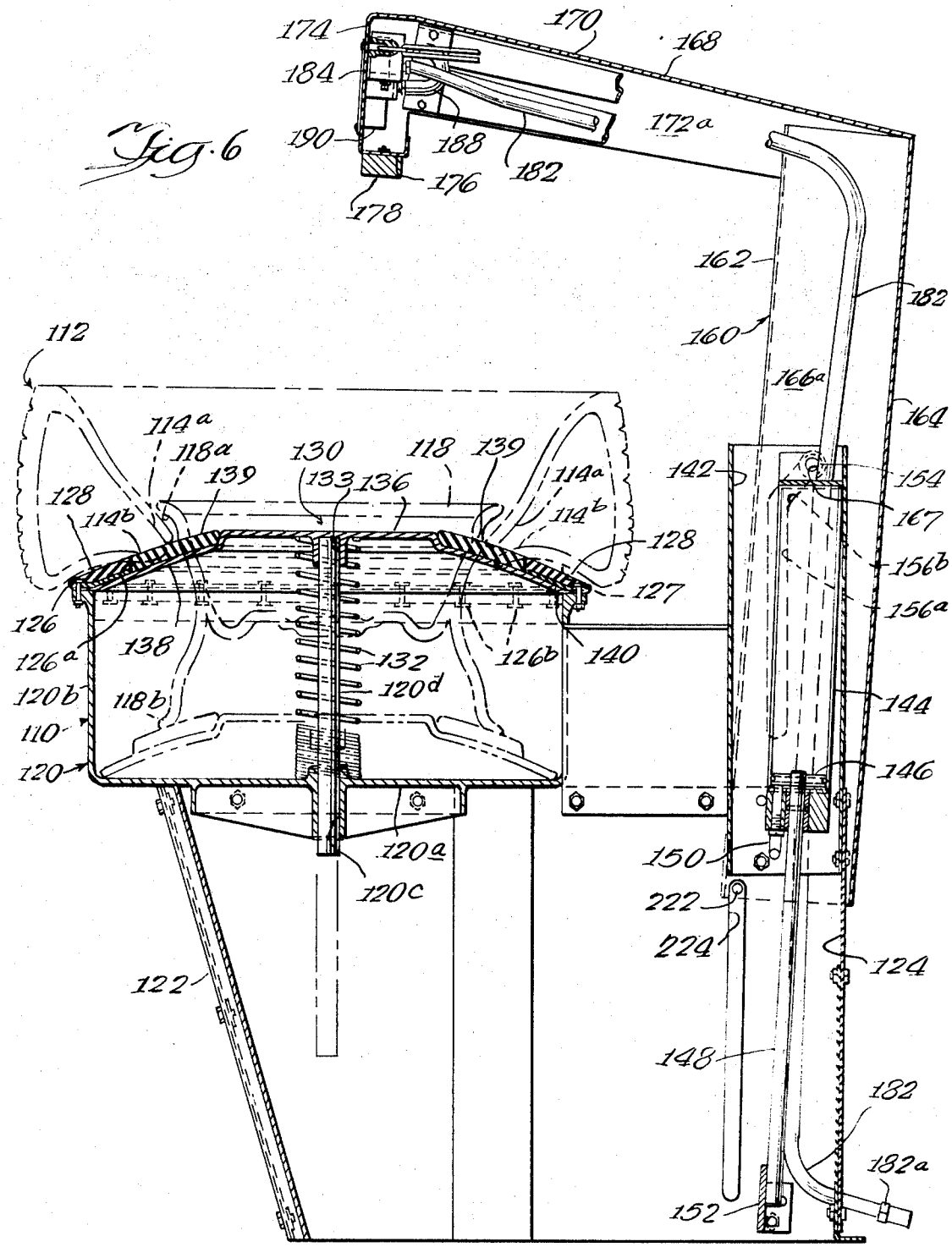

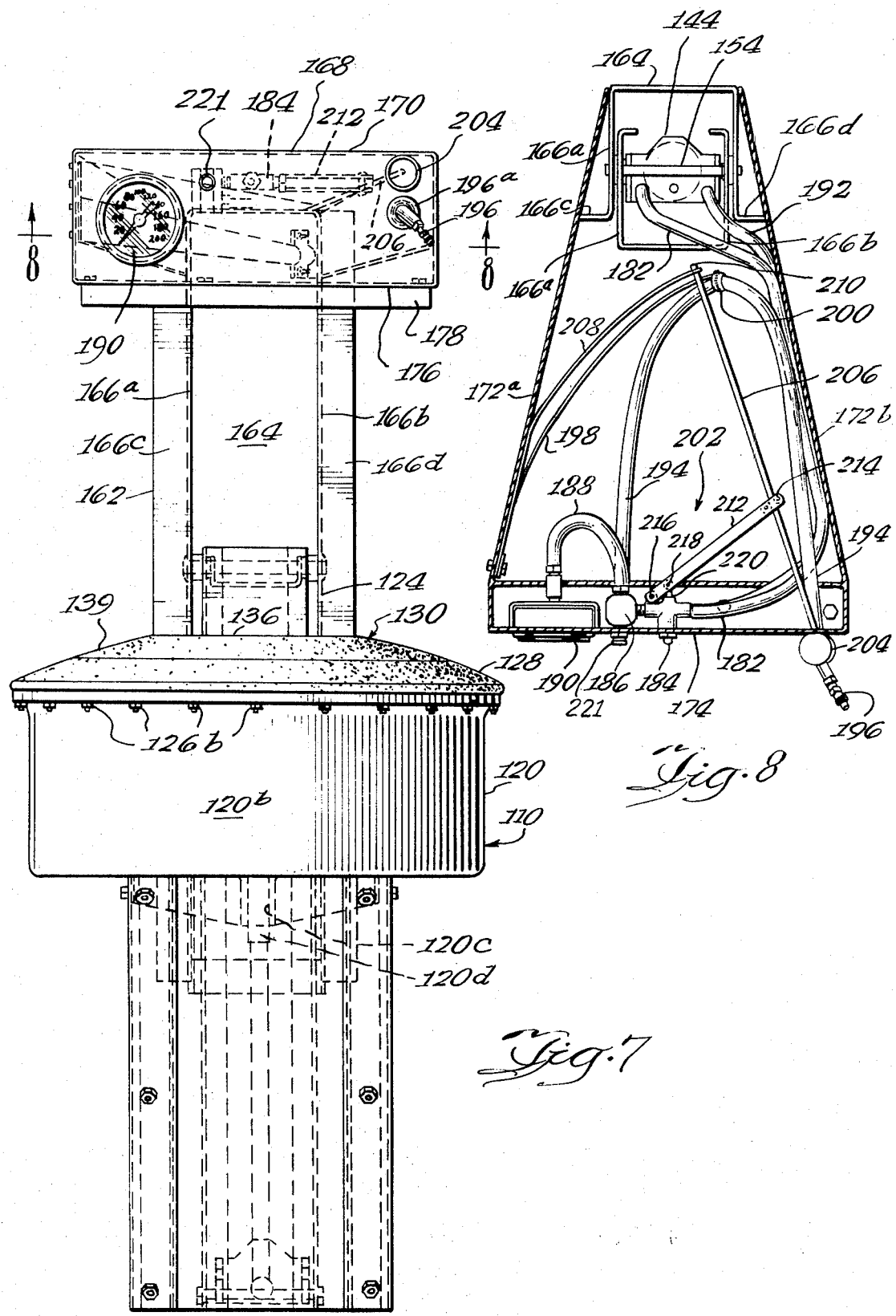

3,669,175

BEAD EXPANDER

RELATED APPLICATIONS

This is a continuation-in-part application of our copending application entitled "Bead Expander", filed Aug. 19, 1968, Ser. No. 753,555, now abandoned.

BACKGROUND OF THE INVENTION

1. Field of the Invention

This invention relates to devices for assisting in seating tire beads to vehicle rims.

2. Description of the Prior Art

Tire bead expanding equipment heretofore known in the art has generally taken two forms. These most common forms have operated on the principle of encircling the tire tread periphery with an element which may be acted upon to uniformly press radially inwardly on the tread periphery. Some such elements are inflatable structures and others are contractible metal bands or the like. Examples of these structures are found in patents issued to Coats U.S. Pat. No. 2,684,112, Twiford U.S. Pat. No. 2,818,913, and Scott et al. U.S. Pat. No. 3,334,864.

Such structures operated satisfactorily for most formerly common types of tires. However, recently so-called "radial" tires have come into increasing use. These tires inherently resist peripheral squeezing efforts to seat the tire beads and thus bead seating structures operating on this principle have been found to be unsatisfactory for use with radial ply tires.

Another form of bead seating apparatus employs two semi-chambers between which the tire and rim are enclosed. An air line leading from a fitting in one of the semi-chamber members must be connected to the rim valve prior to enclosing the tire and rim therebetween. Air is then fed into and through the chamber fitting, expanding the interior of the tire casing and seating the beads thereby.

A variation of this second type of bead seating structure is shown in Twiford U.S. Pat. No. 2,918,115. The Twiford structure is a two-part appliance comprising an inside ring intended to engage a rim flange and an outside ring for engagement with a tire side wall. An O-ring seal is interposed between the two rings to effectively establish a chamber therewith.

Shortcomings of the chamber type of bead seating device are that they are relatively inefficient and cumbersome to set up and use and sometimes expensive to manufacture.

Thus, there has arisen a need to provide an efficient, economical, bead seating appliance which will operate effectively for all types of tires.

SUMMARY OF THE INVENTION

This invention is directed, in brief, to the provision of an improved tire bead seating appliance for effectively seating all types of tires, characterized by a chamber having a resiliently mounted rim supporting surface and peripherally spaced side wall sealing means so that air may be fed directly to the rim valve to inflate the casing and seat the tire beads.

The best mode currently contemplated by us for carrying out our invention includes the provision of a hollow cylindrical chamber with an enclosed bottom and open top and a disc-like rim supporting member in the open top of the chamber and supported in spaced relationship to the chamber bottom by yieldable means to permit displacement of the rim support downwardly toward the chamber bottom. Both the free edge of the open chamber end and the top of the rim support are provided with a sealing surface, preferably a layer of resilient material having an air-tight skin.

In a preferred embodiment of this invention, a rim depressing member is mounted above the rim supporting member for movement toward and away therefrom for forcing a rim and rim supporting member downwardly in opposition to the yieldable means and to hold all of the areas of sealing engagement in sealing contact during inflation. This rim depressing member may include suitable air gauge indicia as well as a safety arm arrangement enabling an operator to control inflation from a position relatively remote from the appliance.

DESCRIPTION OF THE DRAWINGS

FIG. 1 is a top plan view of a bead seating appliance made in accordance with this invention;

FIG. 2 is a vertical section view taken generally along the lines 2—2 of FIG. 1;

FIG. 6 is a vertical section view of a preferred form of bead seating appliance of this invention.

FIG. 7 is a partially broken front plan view of the bead seating appliance shown in FIG. 6; and FIG. 8 is a horizontal section view taken generally along the lines 8—8 of FIG. 7.

Figure 3:
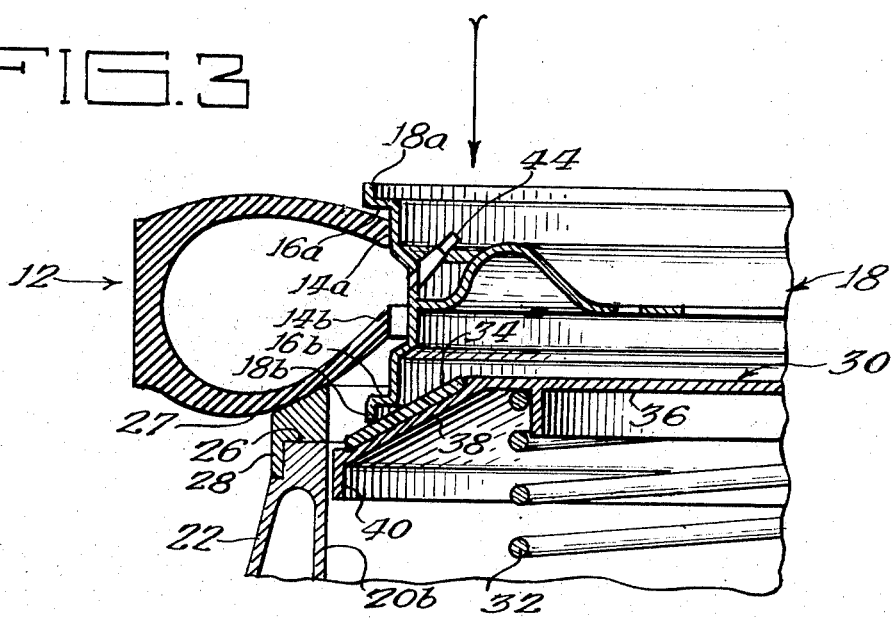
FIG. 3 is a fragmentary enlarged sectional view showing a bead seating appliance made in accordance with this invention in use with a tire and rim thereon and in the initial stages of tire inflation.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

DESCRIPTION OF THE PREFERRED EMBODIMENT

A bead seating appliance 10 made in accordance with this invention, as shown in FIGS. 1 through 5, is preferably formed of a suitably rigid material, such as metal, and is intended for use with a vehicular tire 12 for seating tire beads 14a and 14b on the bead seats 16a and 16b of a tire rim 18 having rim flanges 18a and 18b.

The bead seating appliance 10 includes a generally circular cylindrical chamber 20 having an enclosed bottom 20a and upstanding generally annular or cylindrical side wall 20b integrally connected with the enclosed bottom 20a. An upstanding boss 20c is formed centrally of bottom 20a.

Annular wall 20b merges with a cylindrical depending shell 22 which may be of two parts 22a and 22b. Legs 24, at the bottom of shell 22, support the appliance. The juncture of annular side walls 20b and depending shell 22 define cylindrical edge 26.

Means are provided on the cylindrical edge 26 for establishing fluid sealing engagement with a tire side wall 27, this means 28 preferably taking the form of a resilient material such as foam rubber with a fluid-tight skin. One example of a suitable foam rubber for this purpose is that distributed by the W. S. Nott Company of Minneapolis, Minnesota, known as sponge rubber No. G207–N and being a neoprene closed cell sponge rubber having a "skin" on one side and being approximately one-fourth inch in thickness. Preferably, the upper edge 28a of the sealing surface 28 is tapered upwardly and inwardly as illustrated.

The bead seating device 10 further includes a rim supporting member 30 movably connected to the chamber 20 for movement relative to the chamber and the walls 20b and 22. Preferably, the rim supporting member 30 is mounted on a resilient means, such as a spring 32, which is connected between a boss 30a on the underside of the rim supporting member 30 and also boss 20c. It is to be understood that instead of the single spring as shown, a plurality of springs could be utilized to hold the rim supporting member 30 in the desired position. Member 30 is normally held in a position generally co-planar with the edge 26 and with the edge of member 30 concentrically spaced therewithin. The rim supporting member 30 is provided with means 34 for establishing a fluid seal with a vehicular rim preferably in the form of a resilient material such as foam rubber with a fluid-tight skin, and for this purpose foam rubber, described with respect to sealing surface 28, could be used.

Preferably, the rim supporting member has a generally planar central portion 36 and a downwardly and outwardly tapering flange 38 to give it a dish-like configuration. The flange portion 38 is that portion of a rim supporting member on which the rim flange will rest during the use of the appliance 10. Thus, it is on this portion that the sealing means 34 is found. The flange 38 terminates in a circular edge 40 which is closely spaced within and generally concentric to edge 26. It has been found that the rim supporting member 30 could have a generally planar configuration. However, the dished configuration shown herein works more satisfactorily for use with rims of smaller dimension, such as 13-inch rims or the like.

In use, an operator places a rim and tire generally centered on the support 30. The operator then pushes down on the center portion of the rim with his hands or with a foot forcing the movable rim supporting member downwardly. This causes the edge 26 to relatively push the lower tire side wall 27 toward the opposite side wall until the lower bead 14b pushes the upper bead 14a generally into a sealing relationship with the upper bead seat 16a as shown in FIG. 3. At the same time, surface 28 is generally in sealing relationship with the lower tire side wall 27, and the surface 34 of the rim supporting member is in sealing relationship with the rim flange 18b by means of reaction of spring 32. These sealing points, together with the closed structure of chamber 20, provide a sealed air inflation chamber. Air from hose 42, in communication with a source of air under pressure, is applied directly to the tire valve 44 and fed into the interior of the tire as well as to the interior of the chamber 20.

Figure 4:
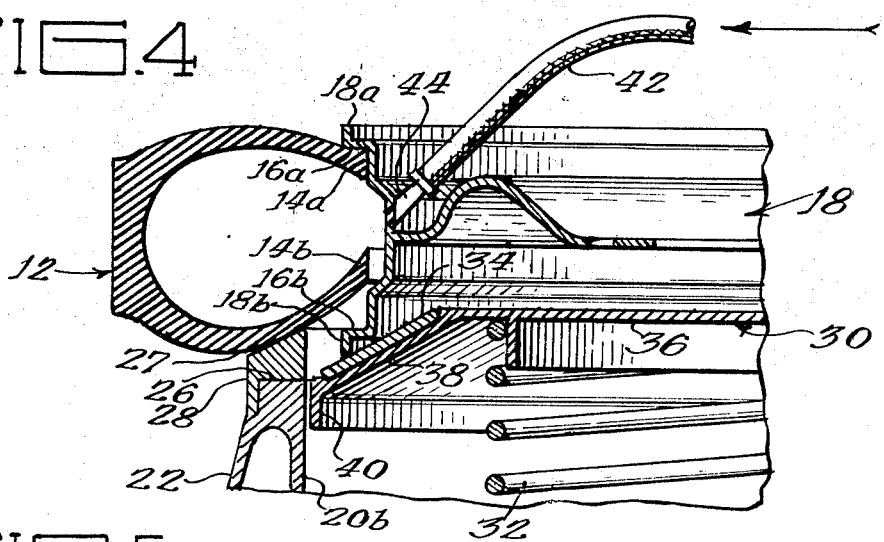
FIG. 4 is a view similar to FIG. 3 showing the appliance and tire and rim in an intermediate stage of tire inflation.
Figure 5:
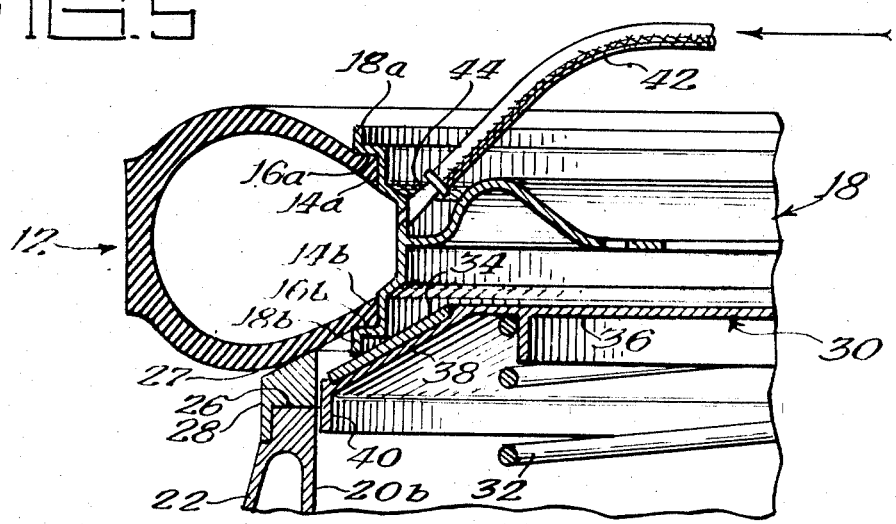
FIG. 5 is a view similar to FIG. 3 and FIG. 4 showing the appliance and tire and rim in advanced stages of tire inflation.

Referring to FIG. 4, as air is fed in, the lower tire bead 14b is forced away from the upper tire bead 14a toward sealing engagement with the lower bead seat 16b. As the tire continues to expand responsive to air being fed therein, bead 14b seats on seat 16b as shown in FIG. 5. The operator may then remove any force applied to the rim to permit the rim supporting member 30 to gradually rise under the influence of the spring 32.

As shown in FIGS. 6 through 8, a preferred embodiment of this invention is the bead seating appliance 110 similarly formed of suitably rigid material and intended for use with a vehicular tire 112 for seating tire beads 114a and 114b on the bead seats 116a and 116b of a tire rim 118 having rim flanges 118a and 118b.

The bead seating appliance 110 includes a generally circular cylindrical chamber 120 having an enclosed bottom 120a and an upstanding generally annular or cylindrical side wall 120b. A sleeve bearing 120c is generally centrally disposed in the bottom 120a for slidably receiving rod 120d.

Chamber 120 is mounted on a supporting base 122. The base 122 includes an upright sleeve-like arm 124 extending upwardly from one side thereof.

Chamber 120 has an open top defined by the cylindrical edge 126 which includes a generally upwardly and inwardly directed annular lip 126a. Lip 126a may be a separate element secured to the chamber 120 by suitable fastening means 126b.

Means are provided on the cylindrical edge 126, including the lip 126a, for establishing fluid sealing engagement with a tire side wall 127. Preferably this means 128 takes the form of a resilient material, such as a foam rubber with a fluid tight skin, similar to that described with respect to the means 28 for bead seating appliance 10.

The bead seating appliance 110 further includes a rim supporting member 130 movably connected to the chamber 120 for movement relative to the chamber, including the wall 120b and the cylindrical edge 126. Preferably the rim supporting member 130 is mounted on a resilient means, such as a spring 132, which is connected between the bearing sleeve 120c on the bottom of the chamber and a hub 133 on the underside of the rim supporting member 130. Hub 133 also receives the rod 120b which guides the rim supporting member in its vertical to and fro movement. It is to be understood that instead of the single spring 132 as shown, a plurality of springs could be utilized to hold the rim supporting member 130 in the desired position.

The rim supporting member 130 has a generally planar central portion 136 and a downwardly and outwardly tapering flange 138 to provide an inverted dish-like configuration. The flange portion 138 of the rim supporting member 130 is that portion on which the rim flanges such as 118a and 118b will rest during the use of the appliance 110. Thus, for this purpose, the rim supporting member 130 is provided with means 139 for establishing a fluid seal with a vehicular rim flange. Preferably this means 139 is in the form of a resilient material, such as a foam rubber with a fluid tight skin, similar to the materials 128 and 28 previously discussed herein.

Rim flange 138 terminates in a circular edge 140 underlying the lip 126a with the sealing means 139 and 128 in tapering alignment. While the rim supporting member 130 could have a generally planar configuration, it is believed that the dished configuration shown herein works more satisfactorily for use with rims of smaller dimension.

The arm 124 of base 122 includes a generally square tubular portion 142. A piston and cylinder device 144 is provided in portion 142 and includes the usual piston 146 connected to the linearly extending rod 148. A fluid line 150 connects with one side of the piston for admitting fluid under pressure. The rod 148 is connected at 152 to the base 122. The cylinder has a cross bolt 154 lying in aligned cam slots 156 in the square tubular portion 142 of the arm. Slots 156 include a generally vertical portion 156a and an upwardly and outwardly inclined portion 156b. Thus, as air is admitted to the cylinder through line 150, the cylinder is pulled downwardly, tracking in the aligned slots 156.

Further included in the bead seating appliance 110 is a rim depressing assembly 160. Included in assembly 160 is a generally upright U-shaped portion 162 which embraces the square tubular portion 142 of the arm 124 and is substantially telescopically related thereto. Portion 162 includes a back 164, and forwardly extending side walls 166a and 166b which terminate in laterally extending flanges 166c and 166d. Cross bolt 154 which tracks in cam slots 156 extends through aligned openings 167 in walls 166a and 166b so as to be held against movement thereto. By this arrangement, when air is admitted through line 150 and the piston and cylinder device 144 is pulled downwardly, the upright portion 162 will also be pulled downwardly.

Connected to upright portion 162 is an inwardly directed or top portion 168 having a top panel 170, side walls 172a and 172b and a forward panel 174. The forward panel includes a rearwardly returned flange or lip 176 facing generally downwardly toward the rim supporting table 130 and to which is connected a resilient member 178 of suitable durable sponge rubber or the like. The lip 176 and resilient surface 178 comprise that portion of the rim depressing assembly 160 which contacts a vehicle tire and rim and constitute the rim depressing member.

An air inlet hose 182 leads from a fitting 182a, for connection with a source of air under pressure, to a control valve 184 which is located adjacent the interior of the forward panel 174. A valve fitting 186 is adjacent control valve 184 and a control gauge hose 188 extends from fitting 186 to the rear of a control gauge 190 for registering the air pressure in the system. Air hose 192 extends from valve fitting to a connection with the piston and cylinder device 144 through line 150.

An inflation hose 194 extends from fitting 186 in a generally U-shaped path through an opening in the front panel 174, terminating in an inflation fitting 196, preferably of the push-on type. Behind fitting 196 is preferably provided the usual enlarged portion 196a for preventing unintended retraction of the hose through the opening in the panel. In the interior of portion 168 the inflation hose 194 is connected to a flex spring 198 by means of a clamp 200 so as to normally keep the inflation hose 194 in a retracted position. However, when it is desired to admit air into the tire 112 being mounted on a rim 118, the hose 194 may be extended outwardly and connected to a valve of rim 118.

A control element or control means 202 is provided for regulating the admission of air into the system. Included in the control means 202 is a control knob 204 which normally projects to the exterior panel 154 and is connected with a cable 206 which extends inwardly of the portion 168. Cable 206 is connected to a return spring 208 by means of connection 210 to normally keep the cable 206 in a retracted position. Cable 206 is further connected to an arm 212, comprised of two parallel spaced bars, by means of connection 214. The arm 212 is also pivoted at 216 to a portion of valve 184. Spacer elements 218 are positioned between the two bars of arm 212 adjacent valve stem 220. Thus, when it is desired to admit fluid under pressure, such as compressed air, through the system, the control element must be actuated by pulling knob 204 outwardly of the machine in opposition to spring 208 until such time as the spacers 218 sufficiently depress the valve stem 220 to permit the admission of air through the system. This provides a safety element in that it will normally require that the operator of the mechanism step backwardly a distance sufficient to be out of the path of travel of the rim and related elements should a weakness in the rim or tire cause an explosion responsive to the admission of air under pressure into the system.

A release valve 221 is also provided on forward panel 174. The release valve is connected with valve fitting 186 in the line adjacent to valve 184. The function of the valve is to provide an outlet means for air under pressure within the system. Pin 222 on the lower end of portion 162 track in parallel upright spaced slots 224 in the lower end of arm 124, to guide vertical movement of rim depressing assembly 160. Suitable return springs (not show) may be provided for returning the cylinder to an at-rest position following completion of the bead seating operation.

It has been found that the bead seating appliance of this invention works most successfully in seating all types of tires whether of radial ply or conventional construction. The structure of the appliance is relatively simple, making it extremely economical to manufacture and of relatively low cost to purchase. Moreover, it may be easily operated by any service station attendant or the like and the set up time is minimal. There is no need to establish a separate connection between the tire valve and an air line since the air line is applied directly to the tire valve when inflating the tire. The relative simplicity of the construction of the seating appliance insures optimum performance thereof for an extended duration of time without the likelihood of malfunction of components or the like.

The preferred embodiment 110 provides the added advantage of a mechanical means for forcing the rim flange, tire side wall, tire bead and sealing means 128 and 139 into sealing engagement. It has been found that in some instances the amount of manual effort necessary to establish the desired seal exceeds the physical abilities of some servicemen and the like. With the appliance 110, the tire is placed on the rim supporting table 130 in a manner similar to that with the appliance 10, following which air under pressure through valve 184 is admitted to the cylinder 144 to pull the cylinder, and therefore the rim depressing assembly 160 downwardly, so that resilient surface 178 on flange 176 engages a tire rim to force the same downwardly to the dotted outline position shown in FIG. 6. By means of the connection of inflation hose fitting 196 to a rim valve stem, and operation of control 202, air under pressure is likewise admitted to the valve 184 to the interior of the tire, causing the side walls to gradually spread. The uppermost bead of the tire will, for all intents and purposes, be seated once the rim is fully depressed and, as the tire expands, the pressure of the air in the system acting upon the greater area of the tire side walls against the annular lip 126a of the cylindrical edge 126 will force the rim, and thus the rim depressing assembly 160, upwardly so that the lower bead of the tire will shortly seat. At such time as the air gauge 190 indicates the desired pressure within the system, the valve 184 may be permitted to close. At this time, the relief valve 221 may be operated to release air from the tire if more than the desired pressure is present therein. Once the desired pressure within the tire is attained, the fitting 196 may be removed from the tire and the relief valve 221 again operated to allow the rim depressing assembly 160 to move to its uppermost position and free the rim with the tire now mounted and inflated thereupon.

Thus, it will be appreciated that the air gauge allows recording of the inflation pressure of the tire to provide a complete servicing operation and the remote air valve control will remove the operator from the area of possible injury to enhance the safe operation of the device.

The foregoing detailed description has been given for clearness of understanding only, and no unnecessary limitations should be understood therefrom as some modifications may be obvious to those skilled in the art.

We claim:

1. A tire bead expander for use in seating tire beads on vehicle rims as part of properly inflating the tire, comprising:
   a base;
   means forming a relatively air tight chamber supported by the base, said chamber having an annular tire side wall sealing surface and a central rim supporting member yieldingly movable into the chamber, said rim supporting member having means for engaging and sealing against a wheel rim periphery,
   said chamber side wall sealing surface and rim supporting member being cooperatively spaced and related to form a relatively air tight closure between a tire side wall, the chamber interior and wheel rim periphery so as to receive tire inflating air,
   an air pressure actuated rim lowering means on said base for engaging said wheel rim and yieldingly forcing same into sealing contact with the rim supporting member, and means interconnecting and supplying air under the same pressure to both said chamber and said pressure actuated means,
   said rim lowering means including a rim lowering member connected to the base for movement whereby the rim supporting member may be moved between a rim lowered position and a rim raised position, and means connected to said rim lowering member for moving the same;
   said rim lowering member including inflation hose circuitry including a fitting for connection with a source of air under pressure, and an inflation hose extending from the rim lowering member for connection to the valve of a rim positioned on the rim supporting member.

2. The tire bead expander of claim 1 wherein the rim lowering member is movably mounted on an arm extending upwardly from one side of the base and wherein the rim lowering member overlies the rim supporting member.

3. The tire bead expander of claim 2 wherein the rim lowering member includes a generally upright portion telescopically related to the arm and wherein a motion transmitting member is interconnected between the arm and the upright portion for moving the rim lowering member toward and away from the rim supporting member.

4. The tire bead expander of claim 1 wherein the inflation hose circuitry includes an inflation gauge.

5. The tire bead expander of claim 1 wherein the inflation circuitry includes a valve member for controlling the admission of air through the inflation hose with the valve member being operably connected to a control element on the rim lowering member by means requiring extension of the control element away from the rim lowering member to open the valve for communication with the inflation hose.

6. The tire bead expander of claim 1 in which air supply and distribution circuitry are provided for the expander including a valved air supply and connections therefrom to both the tire and wheel rim assembly and rim lowering means interconnecting the latter to simultaneously receive air from said valved supply.

* * * * *